Patented Apr. 16, 1935

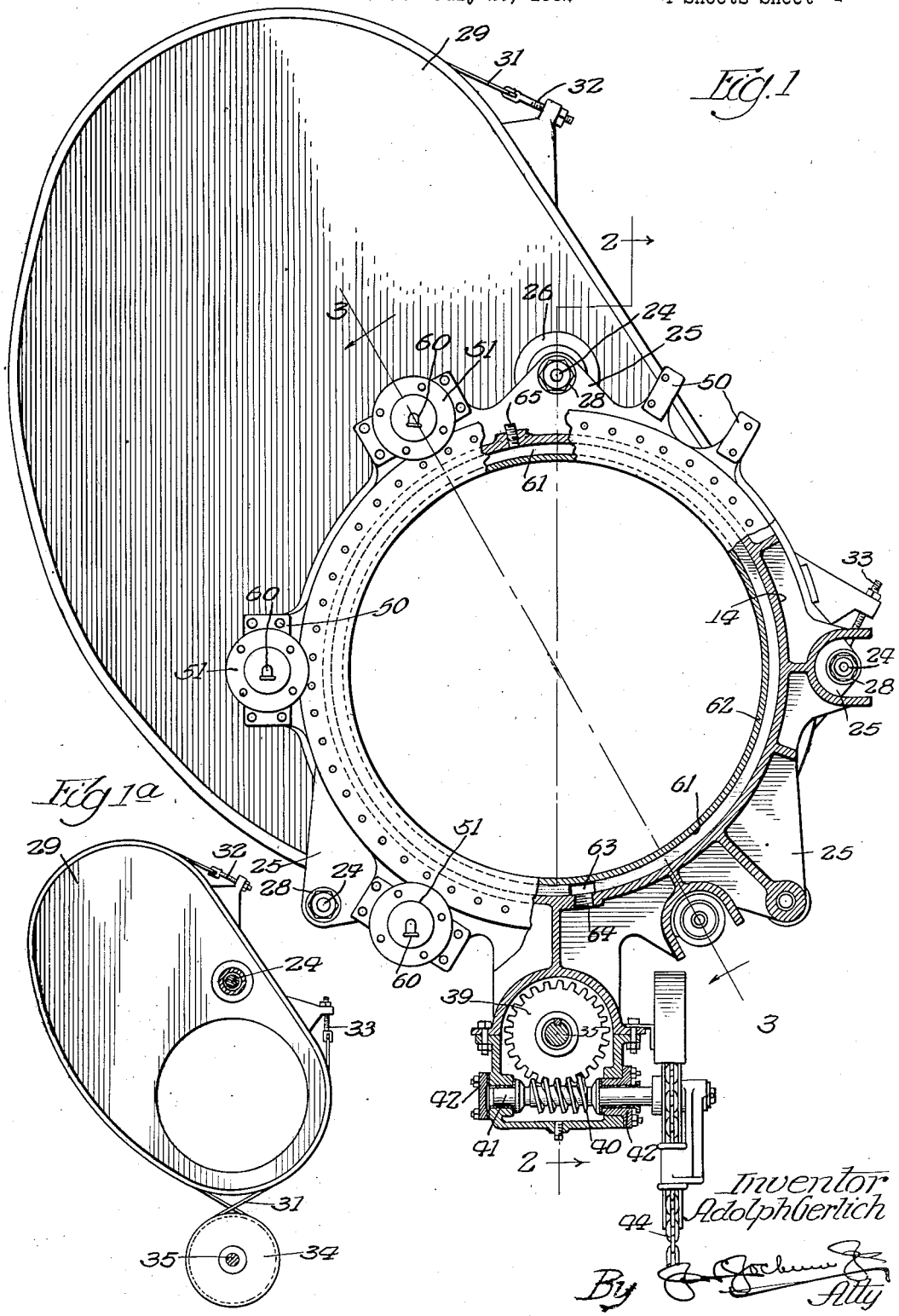

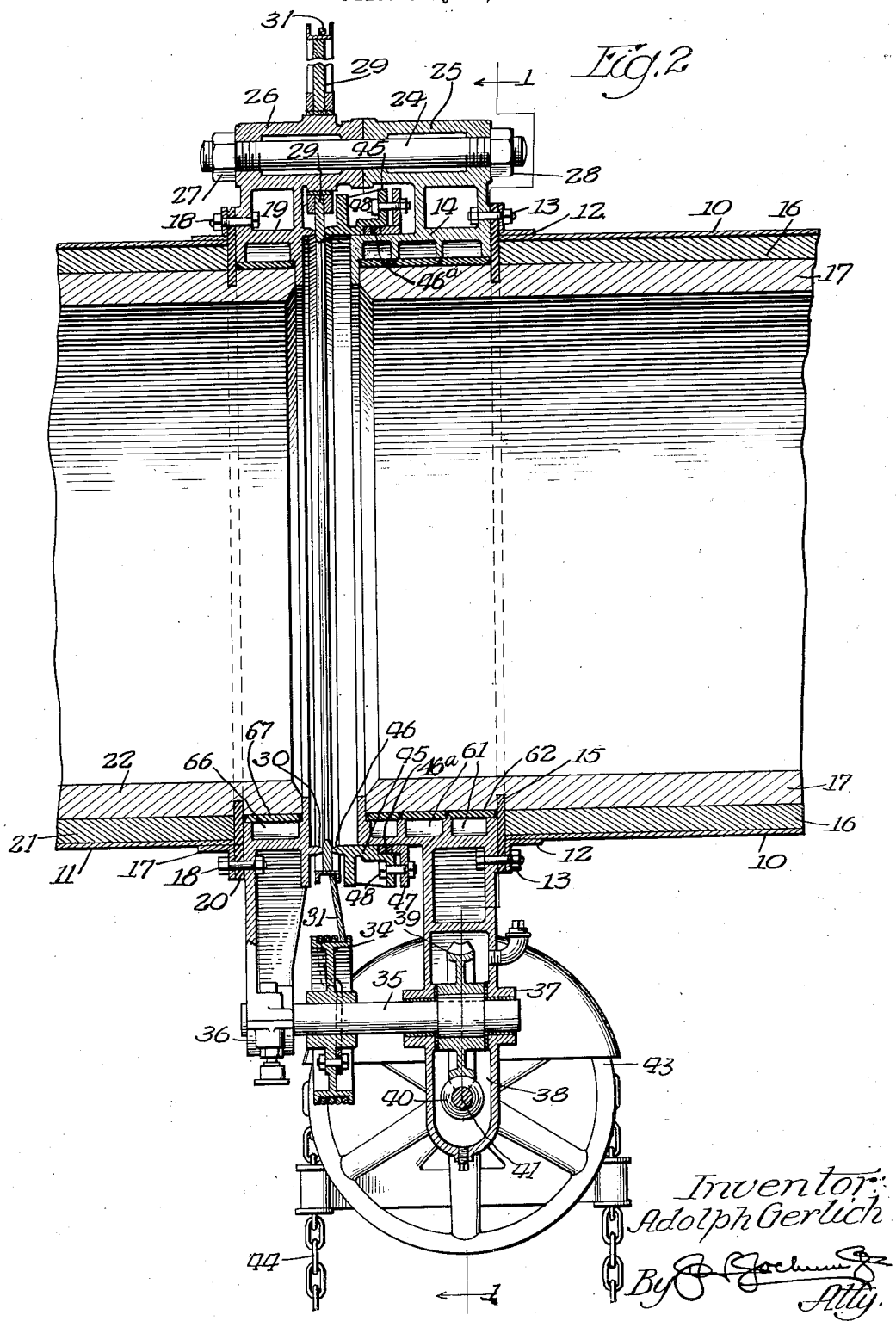

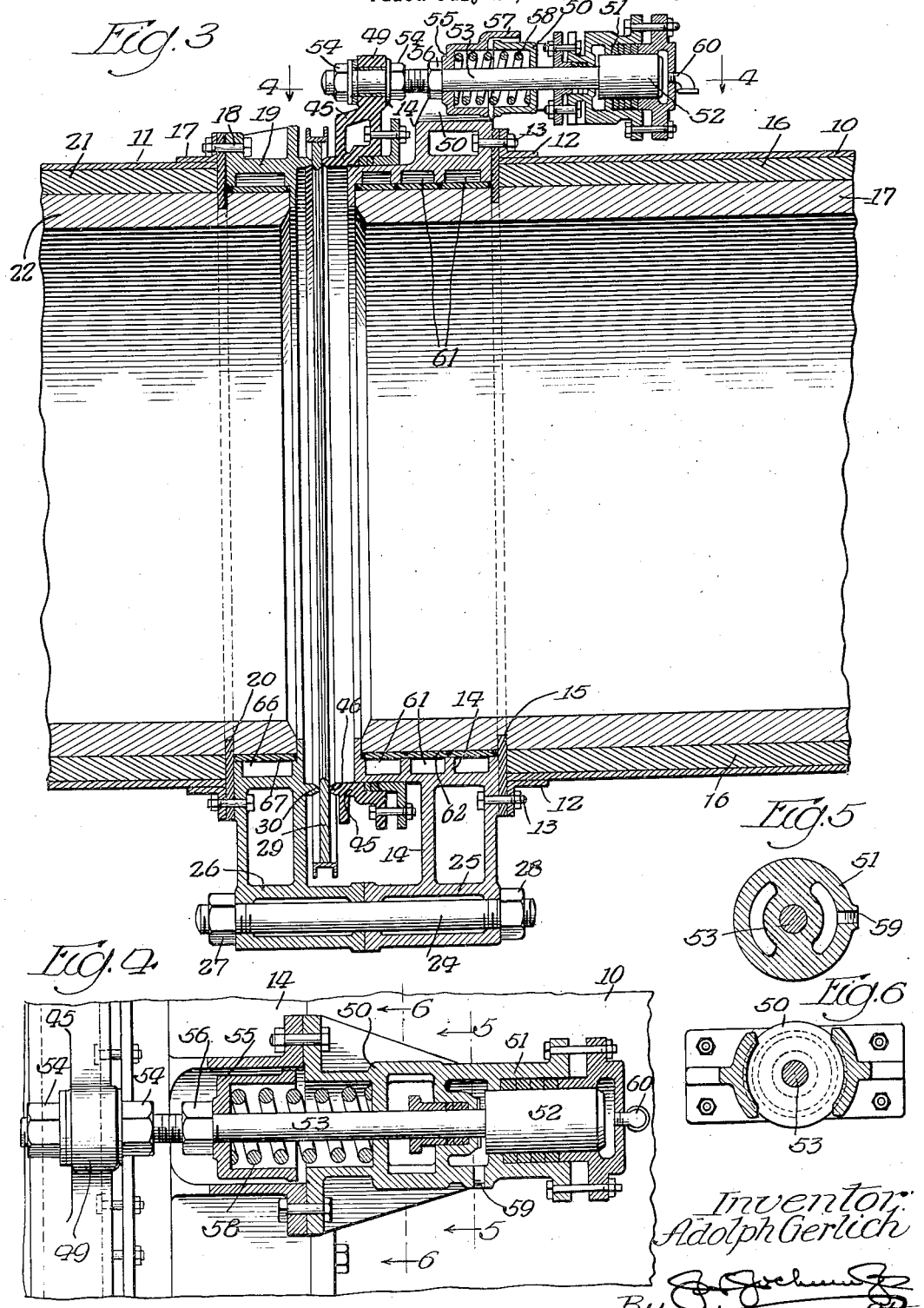

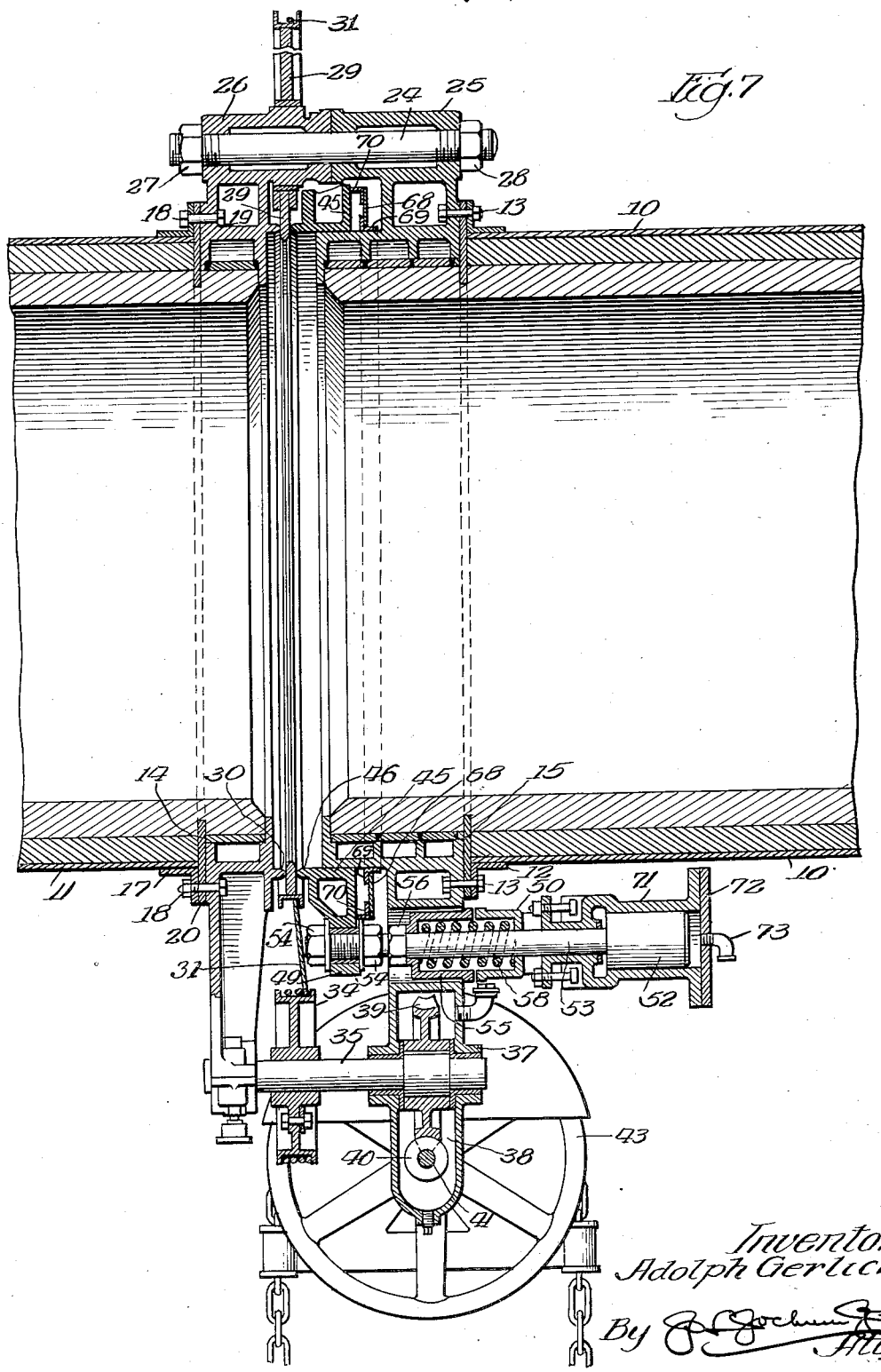

1,998,081

UNITED STATES PATENT OFFICE 1,998,081

VALVE MECHANISM

Adolph Gerlich, Waukegan, Ill.

Application July 29, 1932, Serial No. 626,028

2 Claims. (Cl. 251—167)

In my application Serial Number 522,846 filed on March 16, 1931, there is shown and described a valve construction in which there is employed one or more sliding sleeves, to co-operate with and engage the lateral face or faces of a valve or a goggle plate, the said sleeves being mounted for sliding movement toward and away from the goggle plate or valve as the valve is opened and closed, and which sleeve will not interfere with the backward and forward movements of the main sections under contraction and expansion.

In the said construction however, the operating mechanism for the sleeve is located on both sides of the valve or goggle plate, thereby presenting objections or undesirable features in the construction and operation thereof which it is desired to overcome, as they not only increase the cost of manufacture, but also the amount of labor and expense necessary in assembling and installing the same.

In the present invention all of these objections and difficulties have been overcome, and there is provided an operating mechanism for the sliding sleeve which is disposed entirely on one side of the valve or goggle plate, so that no portion thereof will extend to the other side of the plate, and which construction will facilitate installation, and materially reduce the cost of manufacture or production.

A further object is to provide a structure of this character in which the sliding sleeve and the operating mechanism therefor will constitute a unitary valve element.

A further object is to provide in a valve mechanism of this character, improved means for water cooling the same.

To the attainment of these ends and the accomplishment of other new and useful objects as will appear, the invention consists in the features of novelty in substantially the construction, combination and arrangement of the several parts, hereinafter more fully described and claimed and shown in the accompanying drawings illustrating this invention, and in which;

Figure 1 is a view partly in elevation, partly in section and partly broken away of a valve mechanism of this character constructed in accordance with the principles of this invention, showing the goggle plate or valve in an opening position with respect to the main or conduit and as taken on line 1—1, Figure 2, and on a reduced scale.

Figure 1A is a view of the goggle plate or valve and a portion of the operating mechanism therefor, on a reduced scale.

Figure 2 is a sectional view taken on line 2—2, Figure 1, on an enlarged scale.

Figure 3 is a sectional view taken on line 3—3, Figure 1, on an enlarged scale and with parts omitted.

Figure 4 is a horizontal sectional view taken on line 4—4, Figure 3, on an enlarged scale.

Figure 5 is a detail sectional view taken on line 5—5, Figure 4.

Figure 6 is a detail sectional view taken on line 6—6, Figure 4.

Figure 7 is a view similar to Figure 2 of a modified form of the invention.

Referring more particularly to the drawings the numerals 10 and 11 designate sections of the main or conduit to which the valve is applied. These sections are spaced from each other for a suitable distance, and secured to the section 10, in any suitable manner, such as by means of an annular collar 12 by means of fastening bolts 13, is an annular or ring shaped member 14, arranged in abutting relation thereto, the interior diameter of which is preferably slightly less than the interior diameter of the section 10.

An annular plate 15 may be secured in position between the proximate faces of the main section 10 and the member 14, the interior diameter of which plate is considerably less than the interior diameter of the main section and the member 14. This plate forms an abutment for insulating material 16, and brick work or lining 17 in the main section, and also the brick work in the ring shaped member.

Secured to the main section 11 preferably by means of an anchoring flange 17 and suitable fastening bolts 18, is an annular or ring shaped member 19, and disposed between the members 17 and 19 and the end of the section 11 is an annular plate or ring 20, similar to the plate 15, and forms an abutment to insulating material 21 and brick work 22 in the main section 11 and member 19.

These members 19 and 14 are spaced from each other so as to form a space within which a valve or goggle plate 23 is adapted to swing into an opening and closing position with relation to the flow area of the main section or conduit.

The members 14 and 19 are secured together in any desirable or suitable manner and are maintained in spaced relation to each other preferably by means of tie rods or bolts 24 passing through abutting portions 25, 26 respectively on the members 14 and 19. These bolts are provided with nuts or collars 27—28 threaded upon the ends thereof.

A valve or goggle plate 29 is pivotally supported by one of the bolts 24, preferably by having bearing upon the member 26, and the valve plate is adapted to swing in place between the members 14 and 19. A portion of the member 19 is reduced as at 30 to contact with the lateral face of the valve or plate 29.

The valve is adapted to be swung upon its pivot in any suitable manner, preferably by means of a flexible member or cable 31, one end of which is adjustably anchored to the valve plate by means of an adjustable anchor bolt 32, and the other end of the cable is adjustably secured by means of the anchor bolt 33 to another portion of the valve. The cable passes around a drum 34 and said drum is secured to a shaft 35 journaled in suitable bearings 36—37.

To the shaft 35, and within the housing 38, is secured a worm wheel 39 which meshes with a worm gear 40, that in turn is secured to a shaft 41 journaled in suitable bearings 42. The shaft 41 is rotated by means of a wheel 43 over which an operating chain passes, so that by actuating the chain 44 the wheel 43 will be rotated, and this motion will be imparted to the drum 34, to cause the goggle plate to be swung about its pivot into an opening or closing position.

Slidably mounted upon the member 14 is a sleeve 45 which is provided with a reduced or tapered edge 46, adapted to contact with the lateral face of the goggle plate, and packing material 46ª, held in place by means of a packing gland 47, is provided to form a fluid tight joint, the gland being secured by fastening the bolts 48.

Carried by the sleeve 45 are a plurality of extensions or a series of projections 49, any number of which may be provided, and secured to the annular member 14 and projecting beyond the periphery are a plurality of abutments 50 which are preferably hollow (shown more clearly in Figure 3) and which are open at one end, and supported by these abutments are cylinders 51, of any desirable or suitable construction, and in which cylinders pistons 52 operate.

Connected with each of the pistons is a piston rod 53 which passes loosely through the abutment 50, and also through the respective projections 49. The piston rod is secured to the sleeve 45 by means of nuts or collars 54 threaded thereupon, on opposite sides of the projection. Carried by each of the piston rods is a shoulder 55 which is preferably of a cup shaped formation and disposed opposite the open end of the abutment 50, and the shoulder 55 is held in position by means of a nut or collar 56 threaded upon the piston rod 53.

The cup shaped member 55 is preferably provided with a portion 57 extending over the open end of the abutment 50, and encircling the piston rod 53 is a spring 58, one end of which engages the shoulder 55 and the other end, the abutment 50. The normal tendency of the spring 58 is to move the sleeve 45 into contact with a lateral face of the goggle plate 29. By adjusting the collar 56 on the piston rod 53 the stress of the spring 58 may be varied.

The cylinder 51 is provided with an inlet opening 59 (see particularly Figure 4) to permit fluid under pressure to enter thereinto, to operate upon the piston 52 to shift the latter, and with it the sleeve 45, against the stress of the spring 58, and thereby move the sleeve 45 out of contact with the goggle plate, to allow the latter to be swung about its pivot. The cylinder 51 may also be provided with an opening 60 in its head, so as to permit atmospheric air to enter thereinto on one side of the piston, so as not to interfere with the operation of the latter.

With this construction it will be manifest that all of the operating mechanism for the sleeve 45, as well as the sleeve itself, be arranged entirely on one side of the valve or goggle plate, and constitutes with the annular member 14, a unitary valve element structure.

Furthermore, with the parts thus arranged, the cost of manufacture and of installation will be greatly reduced.

If desired, channels 61 may be provided in the member 14, which are closed by an annular plate 62, the latter being secured in position in any suitable manner.

The walls of the channels may be provided with an opening 63 (see particularly Figure 1) to form communication between the channels and a cooling fluid or liquid may be admitted through an inlet opening 64, and discharged through an outlet 65, so as to insure a circulation of the cooling fluid through the channels 61. Likewise a channel 66, closed by plate 67, may be formed in the member 19, and is provided with an inlet and a discharge outlet for circulation of a cooling fluid therethrough.

Obviously any number of cylinders 51 may be provided for operating the sleeve 45.

In the form of the invention shown in Figure 7, the packing gland 47 as well as the packing associated therewith, are omitted and in lieu thereof the sealing between the sleeve 45 and the main member 14 is effected through the medium of a flexible plate 68 which is formed of any suitable material comparatively thin with respect to its width. The plate 68 encompasses the section 14 of the main and the inner periphery thereof is secured to the main section in any desired or suitable manner, such as by being fastened or anchored to an angle shaped member 69 that encompasses and is secured to the main section.

The outer periphery of the plate 68 is anchored or secured to the sleeve 45 in any suitable manner such as by being secured to a bracket or portion 70 carried by or forming a part of the sleeve, and as the peripheries of the plate 68 are respectively anchored or secured to the main section and the sleeve 45, the plate will be flexed laterally when the sleeve is moved upon the main section.

With this construction it will be manifest that there will be formed a fluid tight seal for the joint between the sleeve and the support or main section upon which it moves, as the bracket or portion 70 to which the outer periphery of the plate 68 is anchored, is continuous and forms a closure for the space between the outer periphery of the plate and the sleeve 45.

In this form of the invention the packing for the piston 52 in the cylinder 51 is omitted and the cylinder 71 is extended and of a length slightly greater than the length of the piston 52, the piston 52 contacting throughout substantially its entire length with the wall of the cylinder and secured to the open end of the cylinder 71, and in any desired or suitable manner, is a head 72, and through which head 72 a pipe 73 forming an inlet for fluid, passes.

This arrangement of cylinder and piston simplifies the construction and materially reduces the cost of production in that respect.

While the preferred forms of the invention have been herein shown and described, it is to be understood that various changes may be made in the details of construction, and in the combination and arrangement of the several parts, within the scope of the claims, without departing from the spirit of this invention.

What is claimed as new is:—

1. A valve for controlling fluid circulating means, said valve comprising a goggle plate, a sleeve slidable upon a main section and into contact with a lateral face of said plate, a stationary abutment carried by said main section, a cylinder supported by said abutment, a piston in the cylinder, a piston rod connected with the piston and extending loosely through said abutment, means securing the piston rod to the said sleeve, a shoulder carried by the piston rod, a resiliently yielding element encompassing said piston rod between said abutment and said shoulder and contacting both, and tending normally to move said sleeve against the goggle plate, and means whereby fluid under pressure may be admitted into the cylinder to shift the piston and retract said sleeve against the stress of said element.

2. A valve for controlling fluid circulating means, said valve comprising a goggle plate, a sleeve slidable upon a main section and into contact with a lateral face of said plate, a stationary abutment carried by said main section, a cylinder supported by said abutment, a piston in the cylinder, a piston rod connected with the piston and extending loosely through said abutment, means securing the piston rod to said sleeve, a shoulder carried by the piston rod, a resiliently yielding element encompassing said piston rod between said abutment and said shoulder and contacting both, and tending normally to move said sleeve against the goggle plate, and means whereby fluid under pressure may be admitted into the cylinder to shift the piston and retract said sleeve against the stress of said element, said abutment and said shoulder being shaped to form a housing enclosing said spring.

ADOLPH GERLICH.